Patented Feb. 8, 1938

2,107,830

UNITED STATES PATENT OFFICE 2,107,830

METHOD OF INFLUENCING ENZYMES AND TECHNICALLY USEFUL MICRO-ORGANISMS AND THE LIKE

Paul Liebesny and Hugo Wertheim, Vienna, Austria

No Drawing. Application March 30, 1933, Serial No. 663,642. In Austria April 12, 1932

13 Claims. (Cl. 195—66)

This invention relates to a method of influencing enzymes and technically useful microorganisms, and the like. In the attempts hitherto known to have been made with the object of stimulating the growth and fermenting action of micro-organisms by irradiation use has been made of radium emanation, of radioactive substances, of X-rays, of ultra-violet rays, and high frequency, high tension currents of low intensity. The results obtained from tests have led certain authors to the conclusion that of the above-mentioned kinds of rays the ultra-violet rays exert a pre-eminently biopositive effect.

Investigations have recently been carried out into the effect of electric short waves, ultra short waves, and extremely short waves on human and animal organs afflicted with infectious diseases (Haase und Schliephake, "Strahlentherapie" (Ray Therapeutics), 1931, p. 133; Liebesny, "Wiener Klinische Wochenschrift" (Viennese Clinical Weekly), 1931, p. 653 and p. 1422; Liebesny and Finaly, "Wiener Klinische Wochenschrift", 1932, p 249). For the purpose of the present specification the term "short waves" is to be understood as including waves of wavelengths between 120 metres and 6 metres, the term "ultra short waves" as including waves of wave-lengths between 6 metres and 2 metres, and the term "extremely short waves" as including waves of wave-lengths between 2 metres and 1.8 millimetres. By irradiation with rays of these orders (waves, oscillations) excellent curative results have been obtained with purulent and septic lesions. It has also been proved that the germs of infectious diseases of this nature are destroyed by irradiation in vitro, or at least are to a great extent impaired and checked, and remain so.

It has also been proposed to preserve foodstuffs by irradiation with short electromagnetic waves. By this method of irradiating foodstuffs it is intended to destroy micro-organisms which give rise to the deterioration of the foodstuffs. Thus in all the known instances of the employment of short Hertzian waves, both for medical and for technical purposes, the object has been solely and exclusively the impairing and destruction of micro-organisms. If in one instance or another a beneficial or promoting influence may in fact have been achieved, such result has been obtained in ignorance of the natural preconditions and of the relations between these latter and the effects obtainable, for which reason any such result has been merely a matter of chance.

We have now established, by experiment, the still more surprising fact that the cells of micro- and also of higher organisms are not only furthered as to their growth and propagation by irradiation with the above-mentioned waves, but are also very effectively stimulated as to their enzymatic, or fermentative, or catalytical action. For instance, if yeast be irradiated in accordance with the invention its budding, that is to say its propagation, and at the same time its zymase content and its fermenting power, per cell, can be increased. The irradiation thus exerts a favorable influence in the first place upon the growth of the yeast fungus and in the second place upon the action and formation of the enzyme present in the fungus.

It is in fact already known to subject cereals to the action of high frequency current with a view to promoting malt formation. But whereas according to a prior proposal very high tension currents of voltages of upwards of 1000 volts are to be employed, the present invention contemplates the employment of comparatively low tension currents of some hundreds of volts. Moreover, in contra-distinction to prior proposals the present invention provides for the employment of relatively high current intensities.

The actual effect achieved by the irradiation, has proved to be dependent on various conditions, which are adapted to suit the nature of organism or agent to be influenced, the material to be treated and the degree of the required influencing. The influencing, in accordance with the invention, of living micro- and other organisms, of enzymes, ferments, and the like agents of the animal and vegetable body is therefore effected by the employment of electro-magnetic short waves, ultra-short waves, and extremely short waves, whereby the selection of the wave-length is effected with regard for the nature of the organism or agent to be influenced, and the remaining factors of the irradiation are determined, according to the nature and the quantity of the material to be treated and to the degree of the required influencing. The adaptation of the various conditions to the given factors is effected by suitable dosing of the irradiation which requires to be determined with very great care. The significance of the determination of the interdependent factors is illustrated by the fact that one and the same kind of matter, when treated with high frequency currents, will be favorably influenced by current of one wave-length and deleteriously influenced by current of another wave-length, all other conditions being equal. By alteration of other conditions it is possible for the same kind of matter to be favorably or deleteriously influenced when treated with current of one and the same wave-length. In determining the apportioning or dosing, the wave-length, the lay out of the plant or the apparatus, the duration of the irradiation, the number of separate periods of irradiation, the intensity of the current used, the temperature and other preconditions must be taken into account. The irradiation is preferably carried out intermittently, since continuous action produces deleterious effects in cases in which the same total duration of intermittent action is innocuous. It should be noted that the desired influence may not be brought about for instance by the action of temperature. On the contrary, care is taken that no appreciable rise in temperature shall occur during irradiation. In instances in which an irradiation of mico-organisms is aimed at, the optimum incubation temperature of the organism to be irradiated is not exceeded.

The influencing of enzymes of all kinds, and the like, can be carried out equally well by irradiation of the physiologically active substances themselves or by irradiation of the product forming or containing the substance to be finally influenced. Thus, for example, the enzyme as such, after having been dissolved from the natural initial product in water and precipitated from the solution thus obtained for instance by the addition of alcohol, can be subjected to the irradiation, or the animal-, vegetable-, or microorganism cell, which forms or contains the active substance, can be irradiated. In order, for example, to influence diastase, either the isolated amorphous diastase powder, or equally the seed grain of cereals, or grain intended for the preparation of malt, or even the malt itself (and that either before, during, or after germination) may be irradiated.

The intended influencing of microorganisms and other ferments can also be carried out in the course of a technical process. It can prove advisable, for instance, to influence ferment organisms during the process of fermentation, cheese bacteria and cheese enzymes during the ripening of the cheese.

Since, as is well known, it is also possible to influence negatively with the aid of the waves concerned, provision may be made for the arresting or checking of the development of organisms, or of the action and formation of enzymes, insofar as such arrestment or checking is to be effected in the interests of the carrying out of a desired process.

The application of the irradiation in accordance with the invention does not meet with any appreciable difficulties, since practically all the materials employed in making the apparatus used in the industries concerned are permeable to the waves defined as included within the scope of the present invention.

For the carrying out of the irradiation there are employed the waves produced by a generator of high frequency oscillations. All the systems of connections already known in the art can be employed for the present purpose.

The apportionment of the irradiation can in accordance with this invention also be so determined that a wave is employed which is capable of acting biopositively in regard to one kind of organism or agent and bionegatively in regard to another kind of organism or agent.

*Practical Example 1.*—Yeast on a solid nutritive foundation is irradiated in the condenser field of a short wave sender with a 15 metre wave at an intensity of 150 milliamperes several times, for twenty minutes each time, at a temperature below 30° C. The irradiated yeast grows so vigorously that the nutritive foundation is very soon completely covered with a dense growth, whereas a piece of the same nutritive foundation left unirradiated for purposes of comparison hardly exhibits any sign of commencing growth at the end of the same period of time, and under precisely similar conditions. Microscopic examination shows that the cells are in the most vigorous stage of development. A large number of giant cells, highly intensive budding activity, and very finely granulated cell protoplasm are observable.

*Practical Example 2.*—A mash of carbohydrous substances is inoculated with yeast, and then irradiated several times for 20 minutes each time in the condenser field of a short wave sender with a 4 metre wave at an intensity of 75 milliamperes. The mash exhibits very intensive fermentation almost immediately after irradiation, whereas in the unirradiated mash, under otherwise precisely the same conditions, shows no sign of commencing fermentation. The fermentation of the irradiated mash is concluded sooner than that of the non-irradiated, and gives very high yields of the products of fermentation.

*Practical Example 3.*—A mash of matter containing carbohydrate which has been inoculated with cultivated lactic acid organisms is observed. As before, more intensive and rapid fermentation and greater yields of the product of fermentation are ascertainable in the case of the irradiated mash, as compared with the non-irradiated mash. Similar results occur when mashes inoculated with butyric acid, butyl alcohol-, acetone- and other technically used ferment organisms. The same result is also obtainable if the organisms be first irradiated and then employed for inoculating mashes.

*Practical Example 4.*—Lees are irradiated with a 6 metre wave at an intensity of 80 milliamperes. In the subsequent propagation by the methods commonly employed in the manufacturing of compressed yeast a very considerably higher yield is obtained than with the use of lees which have not been so irradiated. Moreover, the irradiated lees result in better and more vigorous yeast cells of improved raising power.

*Practical Example 5.*—Compressed yeast is irradiated, before drying, as given under Example 1. The irradiated compressed yeast makes durable dry yeast of very great fermenting and raising power. The same result is obtained if the compressed yeast be irradiated during or after drying.

*Practical Example 6.*—Aspergillus-, Mucor-, and penicillium sorts, such as *Asp. oryzae, Asp. niger, mucor amylomyces* Rouxii, Citromyces sorts, etc., and various cheese organisms are irradiated with an 8 metre wave at 100 milliamperes both in vitro and in the usual media. These organisms exhibit, after irradiation, very considerably richer growth and very considerably increased fermenting action, as compared with the non-irradiated organisms.

*Practical Example 7.*—A mesh of substances containing carbohydrate is inoculated with culture yeast and in the course of the fermentation thus set up is infected with acetic acid bacteria. Part of the mash thus treated is irradiated, and another part remains unirradiated. After irradiation has been maintained for a short time it can be ascertained that the acetic acid bacteria have been destroyed, while at the same time the yeast has been so promoted in vitality that the mash is caused to ferment violently, and all the carbohydrate present is converted into alcohol. In the unirradiated portion the increasing of the acetic acid bacteria brings the yeast fermentation to a standstill, and the acidity increases to an excessive extent, so that a large part of the hydrocarbons remains unfermented.

Thus if an alcoholic ferment were to become infected, under practical conditions, with harmful acetic acid bacteria, through inadvertence or wrong treatment, the mash can be saved by the irradiation given in this example.

*Practical Example 8.*—A starchy nutritive base is inoculated with the amylolytically acting fungus *Aspergillus odyzae*, and is irradiated three times in succession, at intervals of four hours, for twenty minutes each time, with a 4 metre wave in the condenser field of a short wave sender. The fungus develops particularly rapidly and luxuriantly in comparison with a non-irradiated culture retained for purposes of checking and comparison. On the following day the previously irradiated culture is again irradiated three times in succession, at intervals of four hours, for twenty minutes each time, with a 15 metre wave. This second irradiation brings the further development of the fungus completely to a standstill, while the non-irradiated comparative culture continues to grow normally.

The results mentioned in all the examples given can also be obtained when, in consequence of any modification or adaptation of the remaining conditions which may happen to become necessary, instead of the given wave lengths waves of other lengths within or in the vicinity of the short wave range should be employed.

We claim:

1. A method of manufacturing yeast, which consists in irradiating ordinary yeast on a nutritive foundation in a condenser field of about 15 meters wave length at an intensity of 150 milliamperes repeatedly in several periods of twenty minutes each at a temperature below 30° C., whereby the growth of said yeast is so vigorous that said foundation rapidly becomes completely covered by dense growth.

2. The method of promoting the growth and activity of yeast, which consists in irradiating the yeast on a nutritive foundation in a condenser field ranging from 4 meters to 15 meters wave length in several periods, while the material irradiated is cooled to such an extent that the optimal cultivation temperature is not exceeded intracellularly.

3. The method of promoting the growth and activity of yeast, which consists in irradiating the yeast in a condenser field ranging from 4 meters to 15 meters wave length in a single period of a temperature below 30° C.

4. The method of promoting vigorous fermentation in mash, which consists in first inoculating with yeast a mash of carbohydrous substances, then irradiating the mash in a condenser field ranging from 4 meters to 15 meters wave length in several periods at a temperature below 30° C.

5. The method of increasing the yeast yield in the manufacturing of compressed yeast, which consists in irradiating mother yeast in a condenser field ranging from 4 meters to 15 meters wave length in several periods at a temperature below 30° C.

6. The method of increasing the durability, raising power, and fermenting power of compressed yeast, which consists in irradiating compressed yeast before drying in a condenser field ranging from 4 meters to 15 meters wave length in several periods at a temperature below 30° C.

7. A method of manufacturing yeast, which consists in irradiating yeast on a nutritive foundation in a condenser field of about 15 meters wave length repeatedly, in several periods, at a temperature below 30° C., whereby said yeast develops richer growth and considerably increased fermenting action.

8. The method of promoting the growth and activity of micro-organisms, characterized by the irradiation of said organisms in a condenser field, ranging from 4 meters to 15 m. wave length in several periods, while the material irradiated is cooled to such an extent that the optimal cultivation temperature is not exceeded intracellularly.

9. The method according to claim 8 which consists in irradiating a medium containing the said organisms.

10. The method according to claim 8, in which the said organisms are irradiated on a nutrient substratum.

11. The method of promoting fermentation in mashes which consists in first inoculating with a ferment organism a mash of matter fermentable by this organism, and then irradiating the mash in a condenser field ranging from 4 meters to 15 m. wave length, while the material irradiated is cooled to such an extent that the optimal cultivation temperature is not exceeded intracellularly.

12. The method of enhancing the efficacy of the enzymes occurring in micro-organisms which consists in isolating such enzymes and irradiating them in a condenser field ranging from 4 meters to 15 m. wave length the temperature being maintained not higher than that of the optimum activity of the enzyme.

13. The method of promoting fungus growth which consists in irradiating a fungus on a nutrient substratum in a condenser field ranging from 4 meters to 15 m. wave length, while the material irradiated is cooled to such an extent that the optimal cultivation temperature is not exceeded intracellularly.

PAUL LIEBESNY.
HUGO WERTHEIM.